Jan. 7, 1964     H. E. HAYNES     3,117,231
OPTICAL TRACKING SYSTEM
Filed July 26, 1956     3 Sheets-Sheet 1

Inventor
HAROLD E. HAYNES

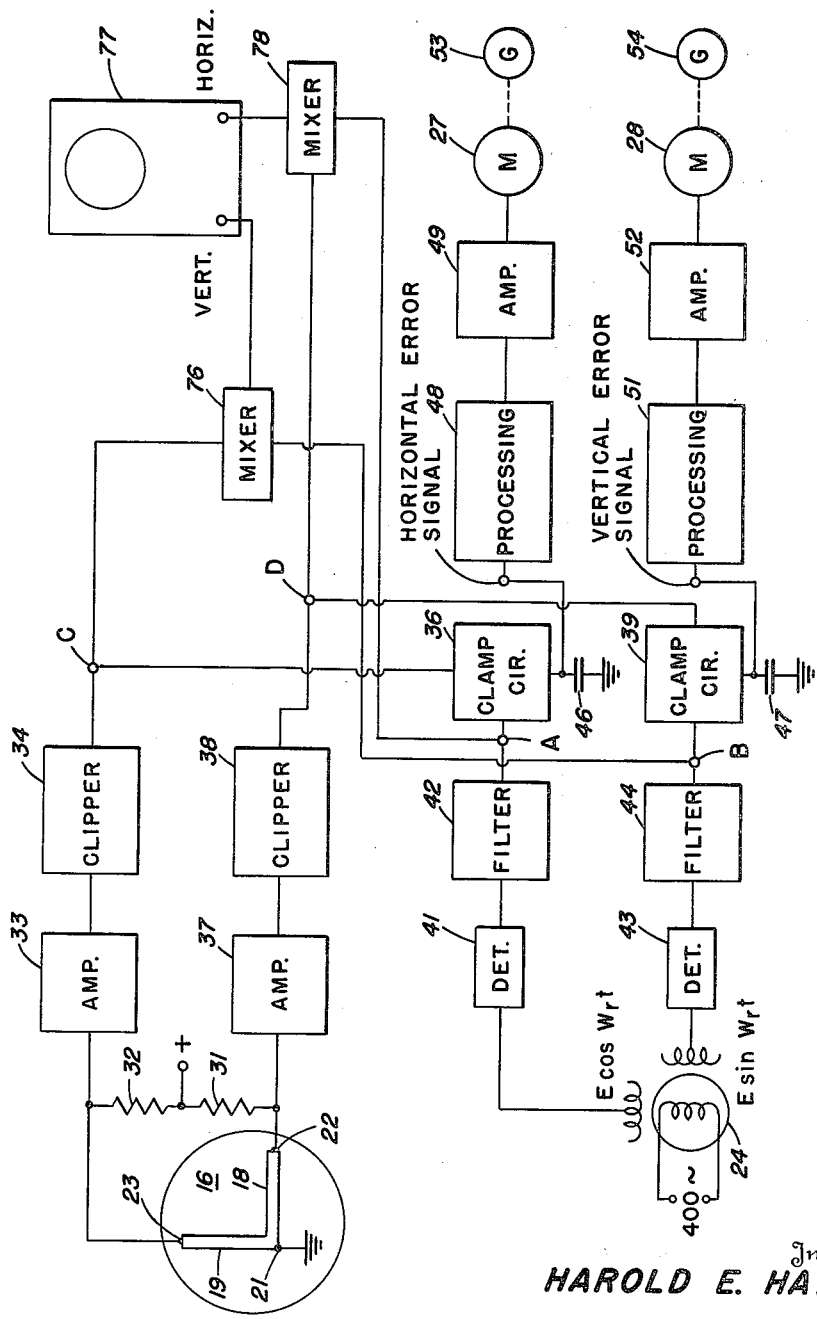

United States Patent Office 3,117,231
Patented Jan. 7, 1964

3,117,231
OPTICAL TRACKING SYSTEM
Harold E. Haynes, Haddonfield, N.J., assignor, by mesne assignments, to the United States of America as represented by the Secretary of the Navy
Filed July 26, 1956, Ser. No. 600,352
10 Claims. (Cl. 250—203)

The present invention relates generally to infra-red sensitive detection devices and specifically to an infra-red sensitive device which will locate and track a heat radiating object such as an aircraft or the like.

This application is a continuation in part of application Serial No. 358,136 filed May 28, 1953, for Optical Training System, now abandoned.

A principal object of the invention is to provide a device for determining the location of distant heat radiating or heat reflecting objects.

Another object of the invention is the provision of means to locate and track an object which radiates or reflects heat.

A further object of the invention is to provide a tracking device of the character described which does not depend upon the amplitude of the signal received or reflected from the heat radiating object to control its tracking mechanism but one which will readily follow and track a distant radiating object at any distance within signal receiving range.

A still further object of the invention is to provide a heat sensitive cell having a relatively large signal receiving area and a relatively small sensitized area on the signal receiving area whereby defects in the sensitivity of the cell will be minimized.

Another object of the invention is to provide a heat sensitive radiation detector which will convert tracking error voltages into timed pulses and project an indication of such pulses on a cathode ray tube in such a manner as to indicate readily the tracking error.

Other objects and many of the attendant advantages of the present invention will be readily appreciated as the same becomes better understood by reference to the following detailed description when considered in connection with the accompanying drawings wherein:

FIG. 4 is a schematic diagram of a suitable electrical circuit for use with the invention.

Figure 1:
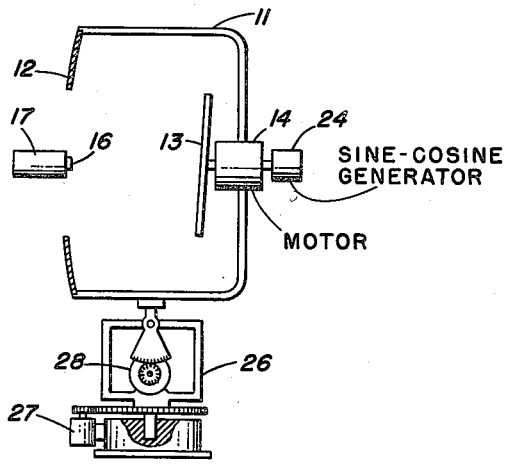
FIG. 1 shows schematically the optical collecting system of the invention.

In FIG. 1, a frame 11 supports a paraboloidal mirror 12 having its center portion removed. Frame 11 may be constructed of a plurality of slender ribs (only one of which is shown in FIG. 1) so as not to significantly obstruct received radiation. A flat secondary mirror 13 is mounted for rotation on the shaft of a motor 14. Mirror 12 is tilted a small amount from the perpendicular of the motor shaft, one degree of tilt being sufficient in most cases. The received radiation is collected by mirror 12 and brought to a focus on the sensitive surface 16 of a photoelectric cell 17 by secondary mirror 13 forming a very small image of the target thereon. The eccentric mounting of mirror 13 causes the image to traverse a circular path on the surface 16 of cell 17, upon rotation of mirror 13 by motor 14.

Referring to FIG. 4, the radiation receiving surface 16 of cell 17 is seen to have two active areas 18 and 19 which may be composed of a photoconductive substance such as lead sulphide or lead selenide. Active areas or photoconductive elements 18, 19 are arranged in the form of long strips or legs laid at a right angle with their meeting ends or vertex 21 provided with an electrical terminal while the free ends 22, 23 thereof are likewise provided with electrical terminals. The size of the image falling on the sensitive surface will be substantially independent of target distance, provided that this distance is quite great so that the image is really the disk of confusion of the optical system. Thus, the width of legs 18, 19 should be made to fit the optical system in question, and will be suitable for this system at any large target distance. The width of each leg 18 or 19 is made equal to the size of the target image projected by the mirror 13 and the length of each leg 18 and 19 is made approximately equal to the diameter of the image path projected by the revolving and tilted mirror 12.

Figures 2, 3:
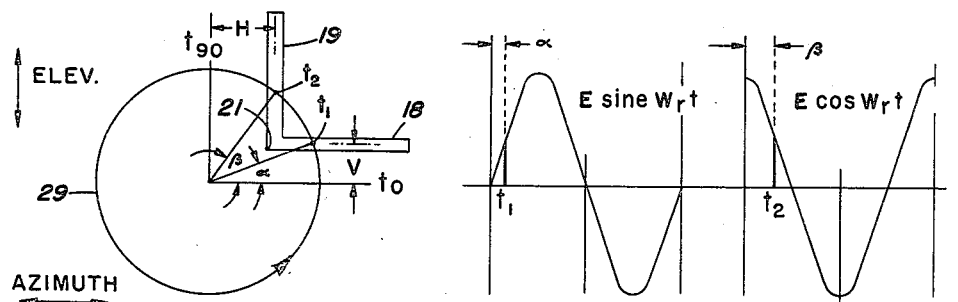
FIG. 2 is a schematic representation of the target image path on the heat sensitive cell of the present invention for one condition of tracking error.
FIG. 3 is a wave diagram illustrating certain principles of the present invention.

Referring again to FIG. 1, there is shown a sine-cosine generator 24 mounted for rotation on the shaft of motor 14. Sine-cosine generator 24 generates a pair of 90° phase displaced voltages, one proportional to the sine of the position angle of mirror 13 (and the target image) and the other to the cosine thereof. A wave diagram of these voltages is shown in FIG. 3 where zero represents a reference position of mirror 13 with respect to horizontal leg 18 of cell 17 determined by the orientation of the cell. The whole of the apparatus thus far described is mounted on gimbals 26 and may be driven by follow-up motors 27, 28 in azimuth and elevation to any direction within the tracking field.

In FIG. 2, there is shown the image path 29 for one condition of tracking error. Zero error exists when the optical line of sight to the target coincides with the axis of rotation of mirror 13. When this condition prevails, the vertex 21 of the cell legs coincides with the center of the target image rotation circle. It is seen that the horizontal component of error H is proportional to $r$ cosine $\beta$ and the vertical component of error V is proportional to $r$ sine $\alpha$, where $r$ is the path radius. Since $r$, the path radius, is a constant, to determine the components of the tracking error, it is only necessary to sense sine $\alpha$ and cosine $\beta$. As will be more fully explained hereinafter in connection with the description of FIG. 4, the functions sine $\alpha$ and cosine $\beta$ are directly available with proper connection and indexing from two-phase generator 24 as $E$ sine $\omega_r t_1$ and $E$ cosine $\omega_r t_2$ (see FIG. 3) where $t_1$ and $t_2$ represent the instants when the target image crosses legs 18 and 19 of the photocell, respectively and $\omega_r$ is proportional to the image rotation velocity.

Referring to FIG. 4, the vertex 21 of cell legs 18, 19 is shown as connected to ground while the free ends 22, 23 thereof are respectively connected to the end terminals of a pair of load resistors 31, 32 which have their common terminal connected to a source of potential. Thus, each time the image impinges upon cell legs 18 or 19, the change in resistance thereof causes a voltage pulse to appear across resistor 31 or 32 respectively. As has been heretofore indicated, the timing of the voltage pulses appearing across load resistors 31, 32 with respect to the position angle of mirror 13 provides an indication of tracking error by establishing the instants of time $t_1$, $t_2$. The vertical leg pulse is coupled through an amplifier 33 and a clipper circuit 34 to a clamp circuit 36. Likewise the horizontal leg pulse is coupled through an amplifier 37 and a clipper circuit 38 to a clamp circuit 39.

Although not essential to the basic operation of the system, amplifiers 33, 37 may have automatic gain control since signal amplitudes may vary between wide limits. The $E$ cosine $\omega_r t$ output from two-phase generator 24 after detection and filtering is applied to clamping circuit 36 while the $E$ sine $\omega_r t$ output of two-phase generator 24 after detection and filtering is applied to clamp circuit 39. Clamp circuits 36, 39 may be double diode driven clamps of conventional design. The vertical leg and horizontal leg pulses serve as clamping pulses while the $E$ cosine $\omega_r t$ and the $E$ sine $\omega_r t$ outputs from two-phase generator 24 are clamping levels. Thus, the voltages which appear across capacitors 46, 47 are equal to $E$ cosine $\omega_r t_2$ and $E$ sine $\omega_r t_1$ and are proportional to cosine $\beta$ and sine $\alpha$, the horizontal and vertical components of tracking error, respectively, as shown in FIG. 3. The error voltages are corrected once per rotation of the target image, and in the intervening interval are floating; thus, very little ripple exists, yet prompt changes of either polarity are accomplished when necessary with little or no time delay.

The horizontal component of tracking error $E$ cosine $\omega_r t_2$ (proportional to cosine $\beta$) may be coupled to azimuth servo motor 27 through a processing circuit 48 and an amplifier 49 and the vertical component of tracking error $E$ sine $\omega_r t_1$ (proportional to sine $\alpha$) may be coupled to elevation servo motor 28 through a processing circuit 51 and an amplifier 52 to thereby cause the optical system to track the target. Data generators 53, 54 are respectively coupled to azimuth servo motor 27 and elevation servo motor 28 to continuously provide for a remote indication of target bearing and elevation, if desired. While the invention is not restricted to any specific servo system, servo motors 27, 28 may be two-phase induction motors of conventional designs. In this case, processing circuits 48, 51 may comprise converter circuits of a type operable to convert the error signals to alternating voltages having the same frequency as the reference voltages applied to servo motors 27 and 28 and a phase and amplitude determined by the polarity and magnitude of the error signals.

Figure 7:
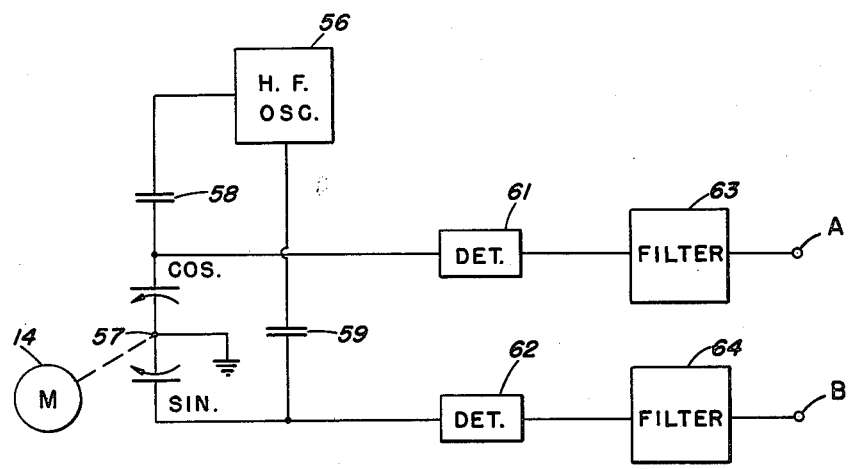
FIG. 7 is a schematic diagram of a modification of a portion of the circuit of FIG. 4.

While the two-phase generator 24 has been shown as a conventional synchro-generator, the high rotational speeds which may be required in the system may require a two-phase generator of the permanent magnet type in order to avoid filtering problems and distortion of the sine and cosine waves. As another alternative, the rotating capacitor sine-cosine generator illustrated in FIG. 7 because of its low mechanical inertia may be particularly suitable for the present application. The system of FIG. 7 comprises a high frequency oscillator 56, a rotary capacitor 57, driven by motor 14, capacitors 58, 59, detector circuits 61, 62 and filter circuits 63, 64. Rotary capacitor 57 forms with capacitors 58, 59 a pair of divider circuits which modulate the output of high frequency oscillator 56 to generate a pair of signals having respectively cosine and sine envelopes proportional in magnitude to the angular position of the mirror 13 (and the target image) with reference to the horizontal leg of the cell. After appropriate detection and filtering, the desired $E$ cosine $\omega_r t$ and $E$ sine $\omega_r t$ voltages appear respectively at terminals A and B (which correspond to terminals A and B of FIG. 4).

Figure 8:
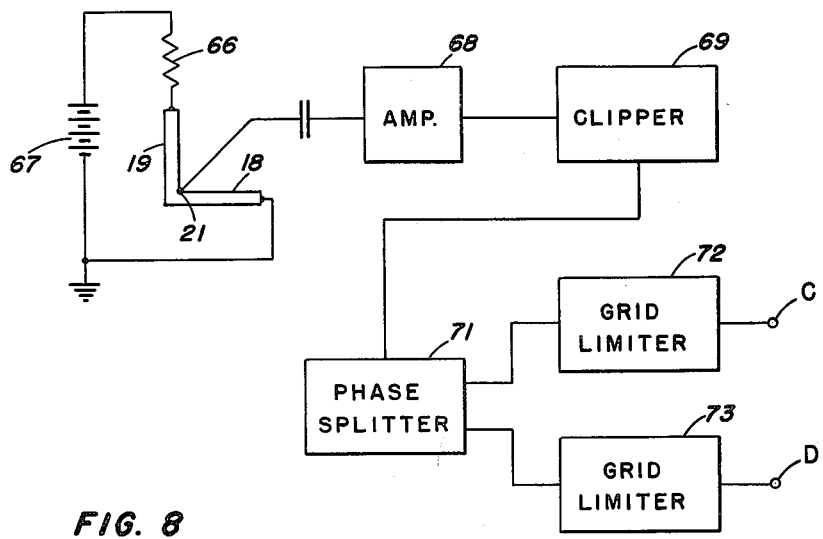
FIG. 8 is a schematic diagram of a modification of another portion of the circuit of FIG. 4.

A modification of the horizontal and vertical leg pulse generator system of FIG. 4 is shown in FIG. 8 and comprises a single channel system as opposed to the two-channel system of FIG. 4. Legs 18, 19 are connected in series with a resistor 66 across a source of potential 67 shown as a battery one terminal of which is grounded. The vertex 21 of legs 18, 19 is coupled through the amplifier 68 a clipper circuit 69 to a phase splitter 71, the outputs of which are coupled through grid limiter circuits 72, 73 to terminals C and D (which correspond to terminals C and D of FIG. 4.) The described circuit gives a negative pulse from the horizontal leg and a positive pulse from the vertical leg. The composite signal is amplified and clipped and coupled through phase splitter 71 to grid limiter circuits 72, 73 which suppress the negative pulses from phase splitter 71 so that only positive pulses appear at terminals C and D, the pulse at C being the vertical leg pulse and the pulse at D being the horizontal leg pulse.

The above described circuit while having the advantage of embodying fewer parts than the corresponding circuit of FIG. 4 requires pulse separation, and is somewhat adversely affected by a difference in sensitivity of cell legs 18, 19.

Figures 5, 6:
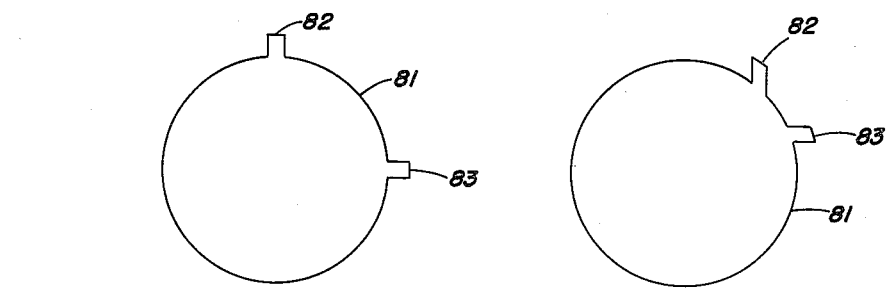
FIG. 5 is a representation of an oscilloscope pattern for zero tracking error.
FIG. 6 is a representation of an oscilloscope pattern for the condition of tracking error, illustrated in FIG. 2.

It may be desirable to provide a graphic visual indication of tracking error. For this purpose an oscilloscope provided with appropriate signal coupling circuitry may be provided. Referring again to FIG. 4, a mixer circuit 76 is provided to couple the vertical leg pulse and the $E$ sine $\omega_r t$ output from two-phase generator 24 to the vertical deflection terminal of an oscilloscope 77. A second mixer circuit 78 is provided to couple the horizontal leg pulse and the $E$ cosine $\omega_r t$ output from two-phase generator 24 to the horizontal deflection terminal of an oscilloscope 77. As shown in FIG. 5, which represents the oscilloscope pattern for zero tracking error, a circular trace 81 is generated upon which is superimposed a pair of lobes 82, 83 which correspond respectively to the output from the vertical and horizontal legs of the cell. FIG. 6 illustrates the oscilloscope pattern obtained when the tracking error is as shown in FIG. 2.

The advantages of the invention include simplicity of operation, simple cell configuration, good signal to noise ratio, and the ability to track a target when initial aim is only moderately good. Further, since tracking error is determined solely by the timing of the pulses from cell legs 18, 19, operation is independent of pulse amplitude. The sampling and clamping circuits described minimize ripple and yet permit extremely prompt response to changes in tracking errors, allowing optimum servo mechanism function.

Obviously many modifications and variations of the present invention are possible in the light of the above teachings. It is therefore to be understood that within the scope of the appended claims the invention may be practiced otherwise than as specifically described.

What is claimed is:

1. An electro-optical system for tracking a target comprising: a photosensitive cell having an active surface thereon comprising two straight photoconductive elements joined end to end as legs at right angles to each other, circuit means connecting said elements to a source of potential output terminal means, circuit means coupling said elements to said output terminal means, an optical system for collecting radiation received from a radiating target, concentrating said collected radiation into a beam, and directing said beam of radiation from said target to the surface of said cell to form an image of said target thereon at a point displaced from the juncture of said elements, said optical system including means for rotating said beam to obtain repeated intersections of said image with the legs of said cell to thereby generate at said output terminal means a series of pulses related in time to tracking error and to the position angle of said beam rotation means, a two-phase generator, means for rotating said generator in synchronism with said beam rotation means and means coupled to said output terminal means and to said two-phase generator for combining said pulses and the output of said two-phase generator to secure tracking error signals.

2. The combination of claim 1 wherein said combining means includes means coupled to said output terminal means to amplify said pulses, means connected to said amplifier means to convert the amplified pulses therefrom to pulses of uniform amplitude, and clamping circuit means connected to said last mentioned means and to said two-phase generator for combining said uniform amplitude pulses with the output of said two-phase generator.

3. The combination of claim 2 including tracking error indicator means comprising an oscilloscope having deflection terminals, circuit means comprising mixer means having input circuit means connected to receive said pulses and the output of said two-phase generator and output circuit means connected to the deflection terminals of said oscilloscope for forming polarized patterns of each intersection of said beam with the legs of said cell on the screen of said oscilloscope, said patterns being polarized substantially at right angles to each other and parallel to the legs of said cell.

4. An electro-optical system for tracking a target comprising a photosensitive cell having an active surface thereon formed of two straight photoconductive elements joined end to end at right angles to each other, circuit means connecting said elements to a source of potential, output terminal means, circuit means coupling said elements to said output terminal means, an optical system for collecting radiation received from a radiating target, concentrating said collected radiation into a beam, and directing said beam of radiation from said target to the surface of said cell to form an image of said target thereon at a point displaced from the juncture of said elements, said optical system including means for rotating said beam to obtain repeated intersections of said image with the legs of said cell to thereby generate at said output terminal means a series of pulses related in time to tracking error and to the position angle of said beam rotation means, a two-phase generator, means for rotating said two-phase generator in synchronism with said beam rotation means, means coupled to said output terminal means and to said two-phase generator for combining said pulses and the output of said two-phase generator to secure tracking error signals, said combining means comprising clamping circuit means having input terminal means and output terminal means, circuit means connecting the output of said two-phase generator to said input terminal means, circuit means including amplifier means and pulse amplitude limiting means for coupling said first mentioned output terminal means to said input terminal means, servo-mechanism means connected to said clamping circuit output terminal means and operative to respond to error signals therefrom to reposition said optical system in elevation and azimuth, an oscilloscope having deflection terminals, and additional circuit means for applying said pulses and the output of said two-phase generator to the deflection terminals of said oscilloscope, whereby the pulses from said repeated intersections of said image with said cell legs appear as polarized lobes superimposed upon a circular pattern path on said oscilloscope indicating the direction and amount of tracking error.

5. An electro-optical system for tracking a target comprising: a cell having an active area thereon formed of two straight photoconductive elements joined end to end as legs at right angles to each other, a resistor having a pair of end terminals and a center terminal, means connecting the end terminals of said resistor to the free ends of said photoconductive elements and the center terminal thereof to a source of potential, means connecting the juncture of said photoconductive elements to a source of reference potential, an optical system for collecting radiation received from a radiating target, concentrating said collected radiation into a beam, and directing said beam of radiation from said target to the surface of said cell to form an image of said target thereon at a point displaced from the juncture of said photoconductive elements, said optical system including means for rotating said beam to obtain repeated intersections of said image with said photoconductive elements to produce a series of voltage pulses between the center terminal of said resistor and the end terminals related in time to tracking error and to the position angle of said beam rotation means, a two-phase generator, means for driving said generator in synchronism with said beam rotation means, amplifier means connected to the end terminals of said resistor, pulse amplitude limiting means connected to the output of said amplifier means, clamping circuit means for combining said pulses and the output of said two-phase generator and having input terminal means and output terminal means, circuit means connecting said input terminal means to said pulse amplitude limiting means and to said two-phase generator, whereby tracking error signals are produced at said output terminal means.

6. The combination of claim 5 including servo-mechanism means connected to said output terminal means to reposition said optical system in elevation and azimuth in response to error signals therefrom.

7. The combination of claim 5 including an oscilloscope having deflection terminals, and circuit means comprising mixer means having input means connected to said pulse amplitude limiting means and to said two-phase generator, and output means connected to the deflection terminals of said oscilloscope for forming polarized patterns of each intersection of said beam with said photoconductive elements of said cell on the screen of said oscilloscope.

8. An electro-optical system for tracking a target comprising: a cell having an active area thereon formed of two straight photoconductive elements joined end to end as legs at right angles to each other, means connecting the free ends of said elements to a source of potential, output terminal means coupled to the juncture of said elements, an optical system for collecting radiation received from a radiating target, concentrating said collected radiation into a beam, and directing said beam of radiation from said target to the surface of said cell to form an image of said target thereon at a point displaced from the juncture of said photoconductive elements, said optical system including means for rotating said beam to obtain repeated intersections of said image with said photoconductive elements to produce a series of voltage pulses at said output terminal means related in time to tracking error and to the position angle of said beam rotation means, a two-phase generator, means for driving said generator in synchronism with said beam rotation means, clamping circuit means for combining said pulses and the output of said two-phase generator and having input terminal means and output terminal means, circuit means including amplifier means, pulse amplitude limiting means, and pulse separation means for connecting said first mentioned output terminal means to said input terminal means, and means connecting the output of said two-phase generator to said input terminal means, whereby tracking error signals are produced at said clamping circuit output terminal means.

9. The combination of claim 8, including servo-mechanism means connected to said clamping circuit output terminal means to reposition said optical system and elevation and azimuth in response to error signals therefrom.

10. The combination of claim 8, including an oscilloscope having deflection terminals, circuit means comprising mixer means for coupling said pulses and the output of said two-phase generator to the deflection terminals of said oscilloscope for forming polarized patterns of each intersection of said beam with said photoconductive elements of said cell on the screen of said oscilloscope.

References Cited in the file of this patent

UNITED STATES PATENTS

| 2,421,012 | Chew | May 27, 1947 |
| 2,425,956 | Salinger | Aug. 19, 1947 |
| 2,513,367 | Scott | July 4, 1950 |
| 2,581,589 | Herbst | Jan. 8, 1952 |
| 2,762,123 | Schultz et al. | Sept. 11, 1956 |